(12) United States Patent
Awazu

(10) Patent No.: US 8,471,952 B2
(45) Date of Patent: Jun. 25, 2013

(54) IMAGE PICKUP APPARATUS

(75) Inventor: Kouhei Awazu, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 269 days.

(21) Appl. No.: 12/877,134

(22) Filed: Sep. 8, 2010

(65) Prior Publication Data

US 2011/0058070 A1 Mar. 10, 2011

(30) Foreign Application Priority Data

Sep. 9, 2009 (JP) ................................. 2009-208361

(51) Int. Cl.
*G03B 13/00* (2006.01)

(52) U.S. Cl.
USPC ......................................................... 348/350

(58) Field of Classification Search
USPC .................. 348/335, 345, 349–351
See application file for complete search history.

(56) References Cited

U.S. PATENT DOCUMENTS

| 6,831,692 | B1 * | 12/2004 | Oda | 348/315 |
| 2004/0246369 | A1 * | 12/2004 | Yamazaki | 348/374 |
| 2005/0225655 | A1 | 10/2005 | Suzuki | |
| 2009/0167927 | A1 * | 7/2009 | Kusaka | 348/345 |

FOREIGN PATENT DOCUMENTS

| JP | 2959142 B2 | 10/1999 |
| JP | 2002-199284 A | 7/2002 |
| JP | 2005-286104 A | 10/2005 |
| JP | 2007-158692 A | 6/2007 |
| JP | 2008-193714 A | 8/2008 |
| JP | 2008-224801 A | 9/2008 |
| JP | 2009-31682 A | 2/2009 |
| WO | WO 2008/132812 A1 | 11/2008 |

* cited by examiner

*Primary Examiner* — Sinh Tran
*Assistant Examiner* — Mark Monk
(74) *Attorney, Agent, or Firm* — Birch, Stewart, Kolasch & Birch, LLP

(57) ABSTRACT

An image pickup apparatus includes: an imaging lens; an image pickup element including pixels of a first and second group, the pixels of the second group including pixels for phase difference detection, the image pickup element configured to be capable of independently reading out first and second image signals from the pixels of the first and second group, respectively; a defocus amount calculation device configured to calculate an amount of defocus of the imaging lens based on image signals read out from the pixels for phase difference detection; a focus control device configured to perform a focus adjustment to make the amount of defocus "0"; an image processing device configured to read out the first and second image signals after the focus adjustment and generate an image for recording based on the first and second image signals; and a recording device configured to record the generated image.

3 Claims, 16 Drawing Sheets

FIG.13
PORTION A
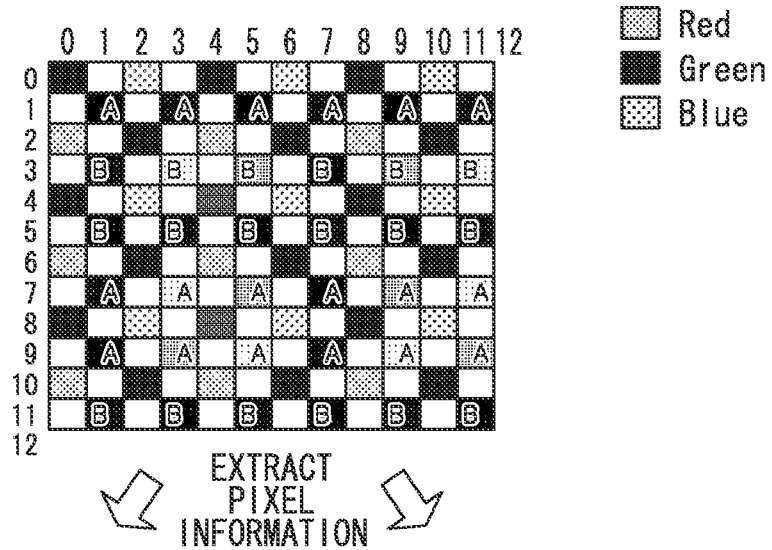
EXTRACT PIXEL INFORMATION
PORTION B
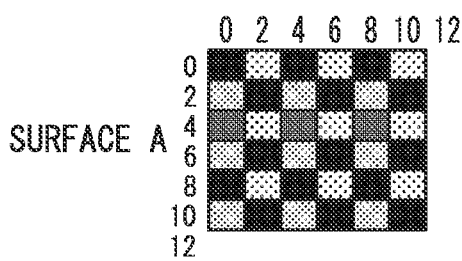
SURFACE A
PORTION D
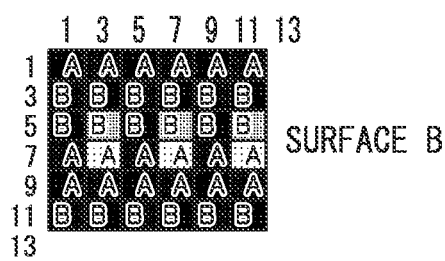
SURFACE B
PORTION C
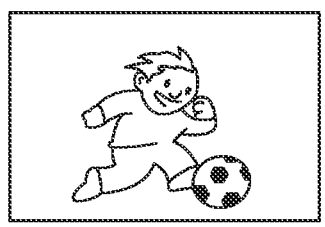
PORTION E
SELECT
PORTION F

FOCUSED STATE

FRONT FOCUS STATE

BACK FOCUS STATE

IMAGE PICKUP APPARATUS

BACKGROUND OF THE INVENTION

1. Field of the Invention

The presently disclosed subject matter relates to an image pickup apparatus, and particularly, to an image pickup apparatus configured to adjust automatic focus (phase difference AF) of a phase difference detection system.

2. Description of the Related Art

FIGS. 15A to 15C illustrate relationships between an image lens 1 and an image pickup surface "m". When a subject is focused, lights a0, b0, and c0 passed through the parts (components) of the imaging lens 1 converge to the image pickup surface m as illustrated in PORTIONS A and B of FIG. 15A, and a focused image Z0 is obtained on the image pickup surface m. When the focus position is in a front focus state compared to the focused state as illustrated in FIG. 15A, lights a1, b1, and c1 passed through the components of the imaging lens 1 converge at the back (right side in PORTION A of FIG. 15B) of the image pickup surface m, and the lights form different images Za1, Zb1, and Zc1 on the image pickup surface m, as illustrated in PORTION B of FIG. 15B. In a back focus state, lights a2, b2, and c2 passed through the components of the imaging lens 1 converge in front (left side in PORTION A of FIG. 15C) of the image pickup surface m, and the lights form different images Za2, Zb2, and Zc2 on the image pickup surface m, as illustrated in PORTION B of FIG. 15C.

Automatic focus for entering the focused state illustrated in FIG. 15A can be controlled by detecting an amount of defocus (amount of displacement of focus) at the front focus state and the back focus state.

Conventionally, to detect the amount of focus, a beam splitter 3 is arranged between the imaging lens 1 and a solid-state image pickup element 2 as illustrated in FIG. 16, and the light divided by the beam splitter 3 enters a sensor 4 for phase difference detection.

However, there is a problem that the size and the cost are disadvantageous if the dedicated sensor 4 is installed and that the light amount entering the solid-state image pickup element 2 is small due to the beam splitter 3.

Therefore, in Japanese Patent No. 2959142, instead of arranging the beam splitter 3 and the AF sensor 4, a dedicated pixel (sensor unit) 6 for phase difference detection is arranged on part of the solid-state image pickup element 5 as illustrated in FIG. 17 to perform phase difference AF.

More specifically, an image pickup apparatus described in Japanese Patent No. 2959142 relatively displaces the positions between elements in a preset predetermined range of the solid-state image pickup element 5 and lenses (microlenses) arranged above the elements and detects the focused state based on the comparison result of output signals of elements displaced in one direction and output signals of elements displaced in another direction.

SUMMARY OF THE INVENTION

However, in the image pickup apparatus described in Japanese Patent No. 2959142, information of phase difference AF can only be detected at predetermined parts of the solid-state image pickup element 5. Therefore, a camera operation of displacing the angle of view for focusing and restoring the angle of view after focusing needs to be performed, and the operation is cumbersome for a user. Thus, there are problems that the pixels for phase difference detection become stains of the image because the pixels for phase difference detection are not used as the image. Furthermore, there is a problem that the degradation of the image cannot be prevented even if the stains of the pixels are corrected (interpolated) and that the pixels for phase difference detection cannot be arranged at a multicity of positions on the solid-state image pickup element 5.

The presently disclosed subject matter has been made in view of the foregoing circumstances, and an object of the presently disclosed subject matter is to provide an image pickup apparatus capable of realizing phase difference AF based on image signals from pixels for phase difference detection arranged in a solid-stage image pickup element and effectively utilizing the pixels for phase difference detection for an image in main imaging to realize taking a wide dynamic range image and taking a high-resolution image.

To attain the object, a first aspect of the presently disclosed subject matter provides an image pickup apparatus including: an imaging lens; an image pickup element including pixels of a first group and pixels of a second group for photoelectric conversion arranged in matrix, the pixels of the second group including pixels for phase difference detection, wherein an incident direction of a light flux which passes through an emission pupil of the imaging lens and enters the pixels of the first group is not restricted, and an incident direction of a light flux which passes through the emission pupil of the imaging lens and enters the pixels of the second group is restricted, the image pickup element configured to be capable of independently reading out first image signals and second image signals from the pixels of the first group and the pixels of the second group, respectively; a defocus amount calculation device configured to read out the second image signals from the image pickup elements and to calculate an amount of defocus of the imaging lens based on image signals read out from the pixels for phase difference detection among the second image signals; a focus control device configured to perform a focus adjustment by moving the imaging lens so as to make the amount of defocus calculated by the defocus amount calculation device "0"; an image processing device configured to read out the first image signals and the second image signals from the image pickup element after the focus adjustment performed by the focus control device and to generate an image for recording based on the read out first image signals and second image signals; and a recording device configured to record the image generated by the image processing device in a recording medium.

According to the first aspect, the first image signals and the second image signals can be independently read out from the pixels of the first group and the pixels of the second group of the image pickup element, respectively. Particularly, the second image signals are read out from the pixels of the second group including the pixels for phase difference detection during phase difference AF, and the focus is controlled based on the image signals corresponding to the pixels for phase difference detection among the second image signals. Therefore, fast AF is possible. Furthermore, the first image signals and the second image signals are read out from the image pickup element during the main imaging after the phase difference AF, and the images for recording are generated based on the read out first image signals and the second image signals. Therefore, the pixels for phase difference detection can be used for the images during the main imaging. As a result, imaging of a wide dynamic range image, imaging of a high-resolution image, etc. can be realized.

A second aspect of the presently disclosed subject matter provides a image pickup apparatus according to the first aspect, wherein the image pickup element includes a microlens for each pixel of the pixels of the first group and the pixels of the second group, and the pixels for phase difference detection among the pixels of the second group include a first pixel provided with a first microlens displaced in a first direction relative to the pixels and a second pixel provided with a second microlens displaced in a second direction which is opposite to the first direction in a planar view of the image pickup element.

A third aspect of the presently disclosed subject matter provides a image pickup apparatus according to the first aspect, wherein the pixels for phase detection of the image pickup element includes one microlens for two adjacent pixels, and the microlens causes the light flux passing through the emission pupil of the imaging lens to split and enter to the two adjacent pixels.

A fourth aspect of the presently disclosed subject matter provides a image pickup apparatus according to any one of the first to third aspects, wherein all of the pixels of the second group of the image pickup element are the pixels for phase difference detection.

During phase difference AF, the amount of defocus is calculated based on image signals obtained from pixels in a preset predetermined range (AF area at screen center, etc.), pixels in a range designated by the user, pixels in a range automatically set by face detection, etc., or pixels in a plurality of ranges in the screen among all pixels of the second group.

A fifth aspect of the presently disclosed subject matter provides a image pickup apparatus according to any one of the first to third aspects, wherein the pixels for phase difference detection and pixels for non-phase difference detection are mixed in the pixels of the second group of the image pickup element.

For example, the pixels for phase difference detection may be dispersed as necessary within one screen, or the pixels may be arranged only in a predetermined range within one screen.

A sixth aspect of the presently disclosed subject matter provides a image pickup apparatus according to the fourth aspect, wherein the image processing device generates a wide dynamic range image based on high-sensitivity first image signals read out from the pixels of the first group and low-sensitivity second image signals read out from the pixels of the second group of the image pickup element.

The pixels of the second group in the image pickup element are restricted by the light receiving direction of the light flux passing through the emission pupil of the imaging lens. Therefore, the incident light amount is small compared to the normal pixels of the first group not restricted by the light receiving direction, and the pixels are low-sensitivity pixels. Thus, the image processing device is designed to generate a wide dynamic range image based on the high-sensitivity first image signals read out from the normal (high-sensitivity) pixels of the first group and the low-sensitivity second image signals read out from the pixels of the second group.

A seventh aspect of the presently disclosed subject matter provides a image pickup apparatus according to the fourth aspect, wherein the image processing device generates a high-sensitivity image and a low-sensitivity image based on the high-sensitivity first image signals read out from the pixels of the first group of the image pickup element and the low-sensitivity second image signals read out from the pixels of the second group, the image pickup apparatus further including: an image display device configured to display the generated high-sensitivity image and low-sensitivity image before recording by the recording device; and an operation device configured to receive an instruction by a user to select one of the high-sensitivity image and the low-sensitivity image displayed on the image display device, wherein the recording device records only the selected image.

According to the seventh aspect, two images, the high-sensitivity image and the low-sensitivity image, can be generated, and one of the two images can be recorded by the selection operation of the user. For example, highlight clipping may occur to the high-luminance part in the high-sensitivity image, and shadow clipping may occur to the low-luminance part in the low-sensitivity image. Therefore, the two images, the high-sensitivity image and the low-sensitivity image are presented for the user to select one of the images.

An eighth aspect of the presently disclosed subject matter provides a image pickup apparatus according to the fourth aspect, further including: an exposure control device configured to individually control exposures in the pixels of the first group and the pixels of the second group of the image pickup element and to make exposure values of the pixels of the first group and exposure values of the pixels of the second group identical, wherein the image processing device generates a high-resolution image based on the first image signals read out from the pixels of the first group and the second image signals read out from the pixels of the second group.

A ninth aspect of the presently disclosed subject matter provides a image pickup apparatus according to the eighth aspect, wherein the exposure control device individually controls charge storage times of the pixels of the first group and the pixels of the second group to make the exposure values of the pixels of the first group and the exposure values of the pixels of the second group identical.

The apparatus according to the ninth aspect individually controls the charge storage times in the pixels of the first group and the pixels of the second group of the image pickup element. Instead of this, the sensitivities (gains) may be individually controlled to make the exposure values of the pixels of the first group and the exposure values of the pixels of the second group identical.

A tenth aspect of the presently disclosed subject matter provides a image pickup apparatus according to the fifth aspect, wherein the image processing device includes a correction device configured to correct the image signals corresponding to the pixels for phase difference detection among the second image signals read out from the pixels of the second group based on the image signals of the pixels for non-phase difference detection adjacent to the pixels for phase difference detection, and the image processing device generates a high-resolution image based on the first image signals read out from the pixels of the first group and the second image signals after correction by the correction device. The correction device interpolates the image signals of the pixels for non-phase difference detection adjacent to the pixels for phase difference detection to calculate the image signals corresponding to the pixels for phase difference detection.

According to the presently disclosed subject matter, the first image signals and the second image signals can be independently read out from the pixels of the first group and the pixels of the second group of the image pickup element, respectively. Particularly, in phase difference AF, the second image signals are read out from the pixels of the second group including the pixels for phase difference detection, and the focus is controlled based on the image signals corresponding to the pixels for phase difference detection among the second image signals. Therefore, fast AF is possible. Furthermore, in the main imaging after the phase difference AF, the first image signals and the second image signals are read out from the image pickup element, and images for recording are generated based on the read out first image signals and the second image signals. Therefore, the images for phase difference detection can be used for the images for the main imaging. As a result, imaging of a wide dynamic range image, imaging of a high-resolution image, etc. can be realized.

BRIEF DESCRIPTION OF THE DRAWINGS

FIG. 13 is a diagram illustrating a flow during selection of an image of a surface A and an image of a surface B according to the presently disclosed subject matter;

DETAILED DESCRIPTION OF THE PREFERRED EMBODIMENTS

Hereinafter, embodiments of an image pickup apparatus according to the presently disclosed subject matter will be described with reference to the attached drawings.
[Entire Configuration of Image Pickup Apparatus]

Figure 1:
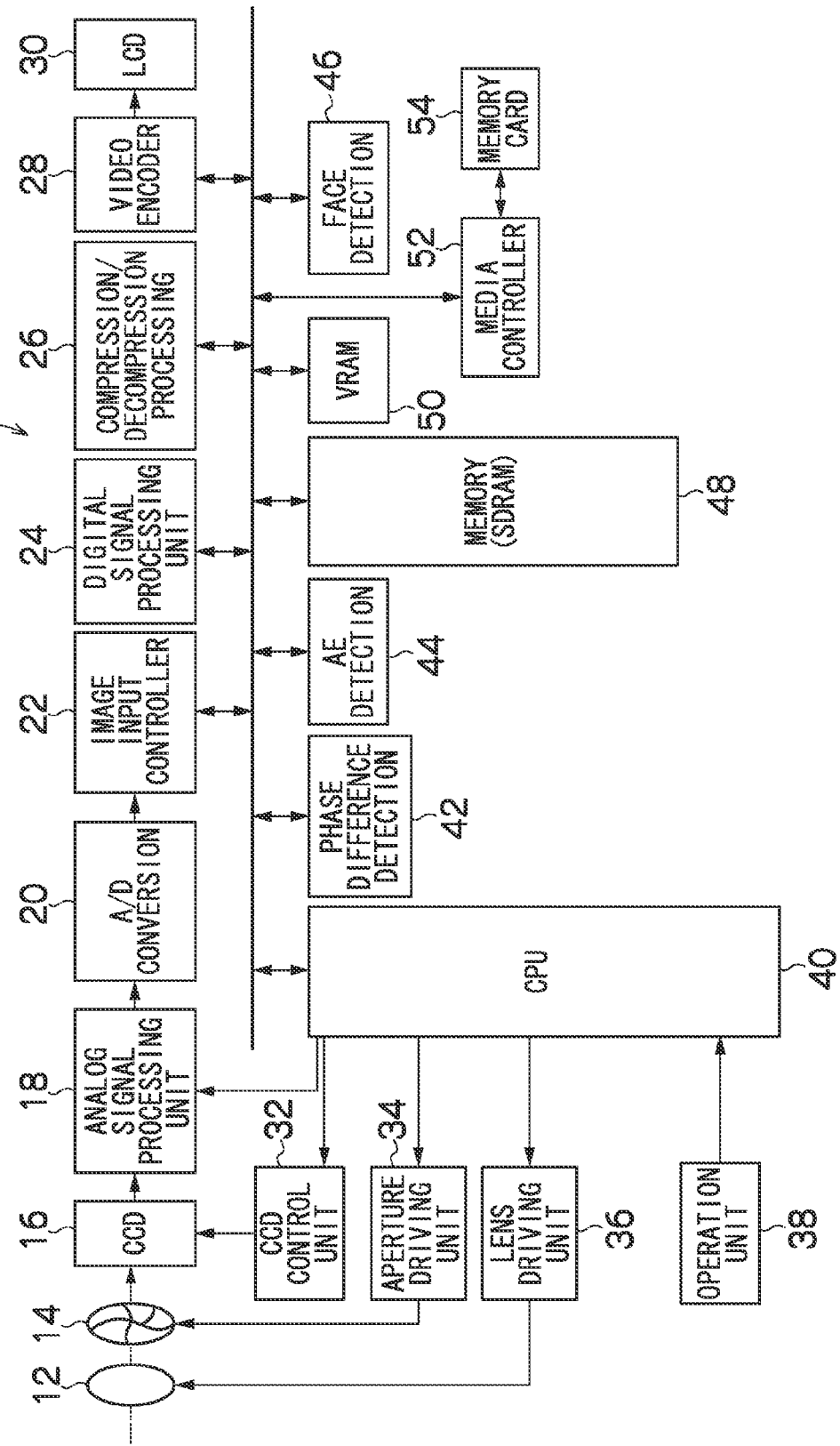
FIG. 1 is a block diagram illustrating embodiments of an image pickup apparatus (digital camera) according to the presently disclosed subject matter.

FIG. 1 is a block diagram illustrating an embodiment of an image pickup apparatus (digital camera 10) according to the presently disclosed subject matter.

The digital camera 10 records photographed images in a memory card 54, and a central processing unit (CPU) 40 comprehensively controls the operation of the camera 10.

The digital camera 10 includes an operation unit 38 including a shutter button, a mode dial, a replay button, a MENU/OK key, arrow keys, a BACK key, etc. A signal from the operation unit 38 is inputted to the CPU 40, and the CPU 40 controls the circuits of the digital camera 10 based on the input signal. For example, the CPU 40 performs lens drive control, imaging operation control, image processing control, recording/replaying control of image data, display control of a liquid crystal monitor (LCD) 30, etc.

The shutter button is an operation button for inputting an instruction to start imaging and is constituted by two-step stroke switches including an S1 switch turned on during half-press and an S2 switch turned on during full-press. The mode dial is a selection device for selecting one of an automatic image mode for imaging a still image, a manual imaging mode, scene positions of people, landscapes, night views, etc., and a moving image mode for imaging a moving image.

The replay button is a button for switching photographed and recorded still images or moving images to a replay mode for display on the liquid crystal monitor 30. The MENU/OK key is an operation key having a function as a menu button for instructing to display a menu on the screen of the liquid crystal monitor 30 and a function as an OK button for instructing confirmation and execution of the selected content. The arrow keys serve as an operation unit for inputting instructions in up, down, left, and right four directions and functions as a button (cursor movement operation device) for selecting an item from the menu screen or instructing selection of various setting items from the menu. The up/down keys of the arrow keys function as zoom switches during imaging or as replay zoom switches during the replay mode, and the left/right keys function as buttons for frame advancing (advancing in forward direction/backward direction) in the replay mode. The BACK key is used to delete a desired target, such as a selection item, to cancel the content of instruction, or to return to the previous operation state.

In the imaging mode, an image of image light illustrating a subject is formed on a light receiving surface of a solid-state image pickup element (hereinafter, called "CCD") 16 as a CCD (Charge Coupled Device) image sensor through an imaging lens 12 and an aperture 14. A lens driving unit 36 controlled by the CPU 40 drives the imaging lens 12, and the imaging lens 12 performs focus control, zoom control, etc. The aperture 14 is made of, for example, five aperture blades. An aperture driving unit 34 controlled by the CPU 40 drives the aperture 14 and controls the aperture in, for example, five steps from aperture values F2.8 to F11 on an AV (Aperture Value) basis.

The CPU 40 controls the aperture 14 through the aperture driving unit 34 and performs, for example, reading control of charge storage time (shutter speed) in the CCD 16 or of an image signal from the CCD 16 through a CCD control unit 32.
<First Example of Configuration of CCD>

Figure 2:
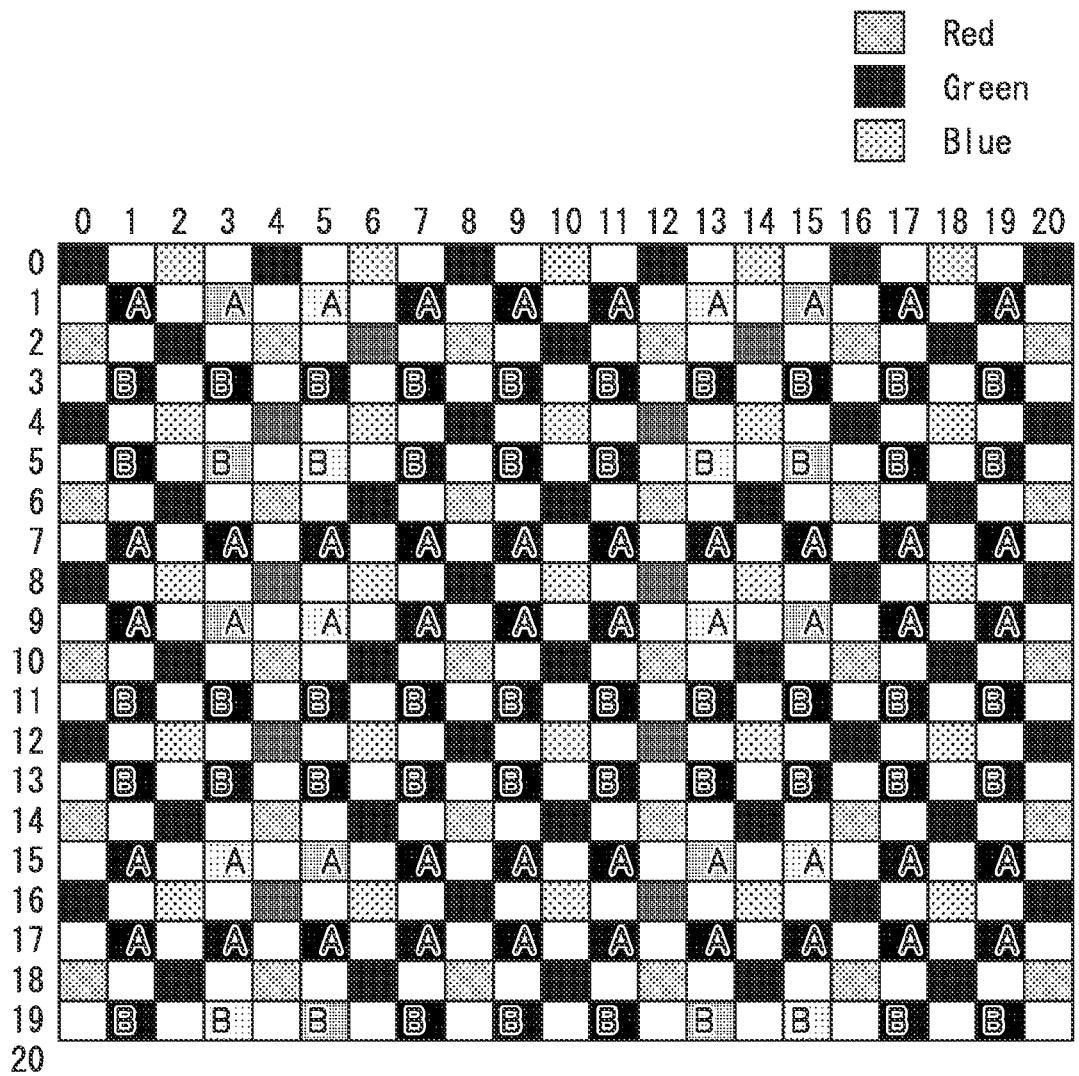
FIG. 2 is a diagram illustrating a first example of configuration of a CCD according to the presently disclosed subject matter.

FIG. 2 is a diagram illustrating a first example of configuration of the CCD 16 according to the presently disclosed subject matter.

The CCD 16 includes a pixel group of even number lines and a pixel group of odd number lines that are arranged in a matrix. Image signals of two surfaces photoelectrically converted by the two pixel groups can be independently read out as described below.

As illustrated in FIG. 2, among the pixels comprising R (red), G (green), and B (blue) color filters, lines in GBGB . . . pixel arrangement and lines in RGRGRG . . . pixel arrangement are alternately provided in the even number lines (0, 2, 4, . . . ) of the CCD 16. On the other hands, in the pixels of the odd number lines (1, 3, 5, . . . ), lines in GBGB . . . pixel arrangement and lines in RGRGRG ... pixel arrangement are alternately provided as in the even number lines, and the pixels are displaced in the line direction by one-half pitch relative to the even number lines.

Figure 3:
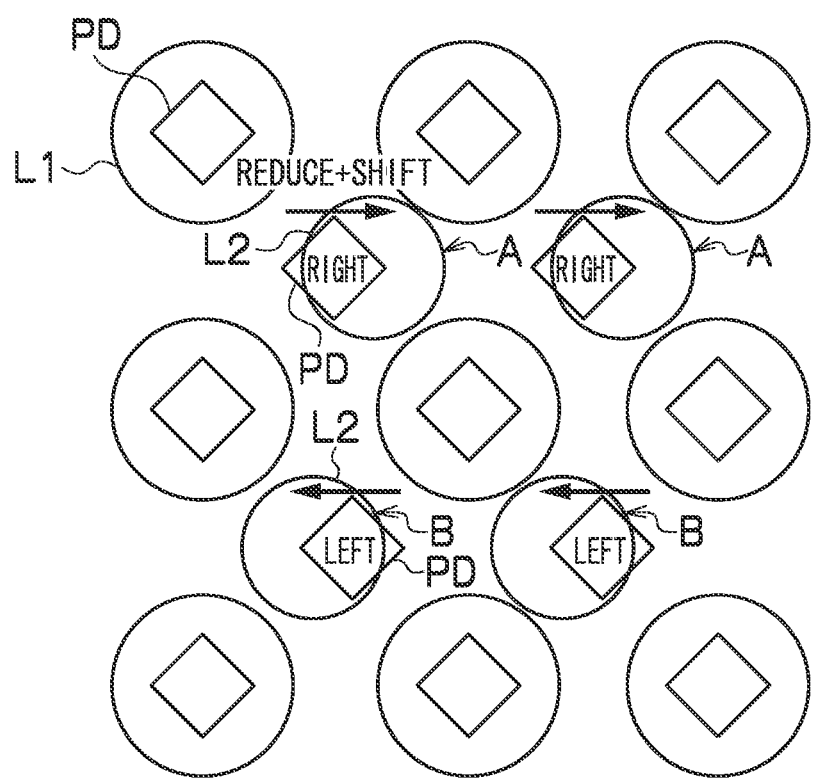
FIG. 3 is an enlarged view of a part of the CCD illustrated in FIG. 2.

The pixels of the odd number lines serve as pixels for phase difference detection. More specifically, as illustrated in FIG. 3, in normal pixels of even number lines, the centers of photoelectric conversion elements (photodiodes) PD and the centers of microlenses L1 arranged over the photodiodes PD match. On the other hand, in the pixels for phase difference detection of odd number lines, the centers of the photodiodes PD and the centers of microlenses L2 arranged over the photodiodes PD do not match, and the microlenses L2 are smaller than the microlenses L1.

As distinguished by reference characters A and B in FIGS. 2 and 3, the pixels for phase difference detection include two types of pixels: pixels in which the microlenses L2 are displaced to the right relative to the photodiodes PD; and pixels in which the microlenses L2 are displaced to the left.

Figure 4:
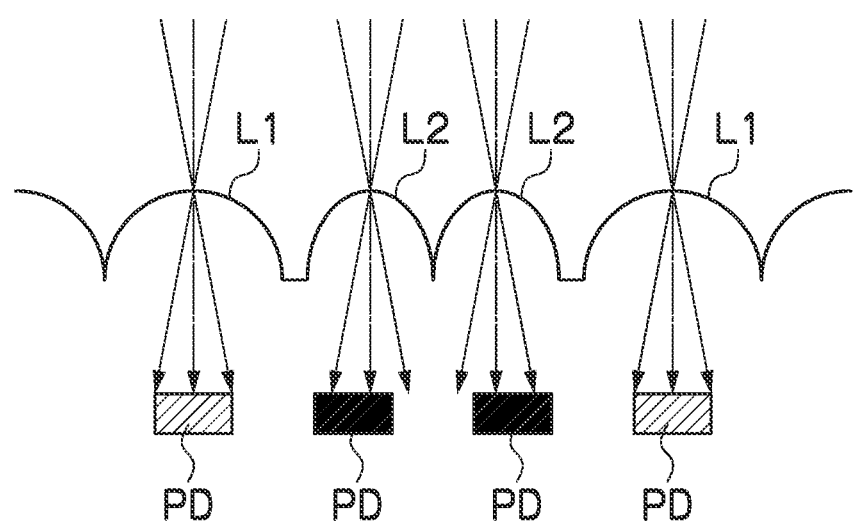
FIG. 4 is a diagram schematically illustrating a cross section of the CCD illustrated in FIG. 3.

FIG. 4 schematically illustrates a cross section of the CCD 16. As illustrated in FIG. 4, the microlenses L1 collect (condense) the light of normal pixels on the photodiodes PD so that the light flux passing through the emission pupil of the imaging lens 12 is not restricted by the light receiving direction (incident direction). However, in the pixels for phase difference detection, the microlenses L2 and the photodiodes PD are arranged so that the light flux passing through the emission pupil of the imaging lens 12 is restricted by the light receiving direction. The directions of the restrictions in the light receiving direction of light flux are different between the pixels A and B.

Figure 5A:
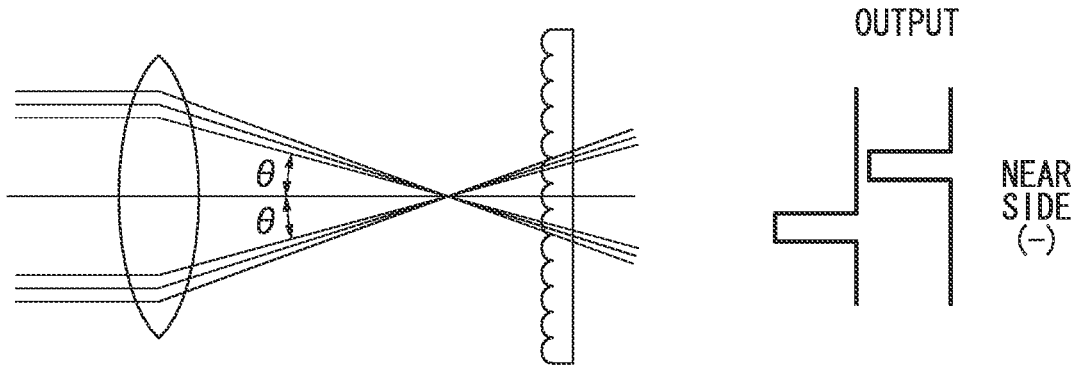
FIGS. 5A to 5C are diagrams illustrating a relationship between a focused state and outputs of pixels A and B (phase difference) for phase difference detection.
Figure 5B:
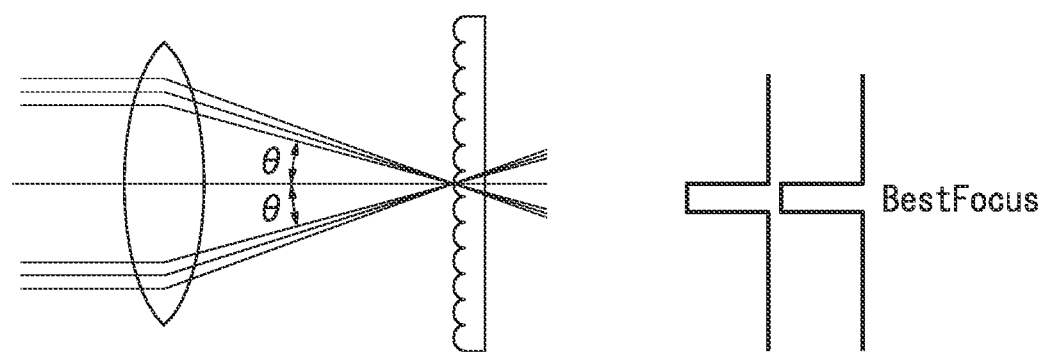
Figure 5C:
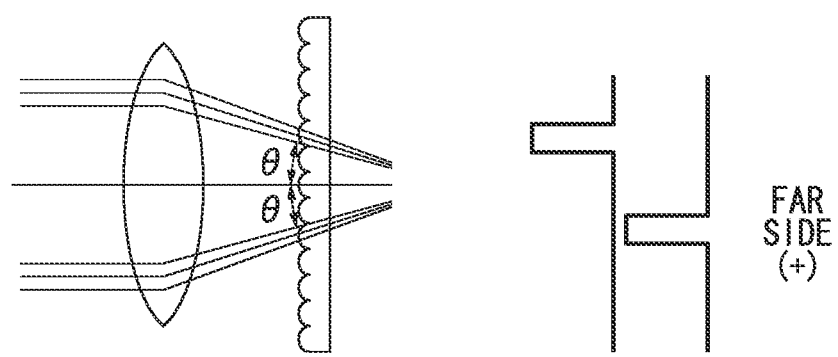

Therefore, phases of the outputs of the pixels A and B are deviated or identical depending on the states of back focusing (FIG. 5C), focusing (FIG. 5B), and front focusing (FIG. 5A). A phase difference in output signals of the pixels A and B for phase difference detection corresponds to an amount of defocus of the imaging lens 12. Therefore, AF of the imaging lens 12 can be controlled by detecting the phase difference.

Figure 6:
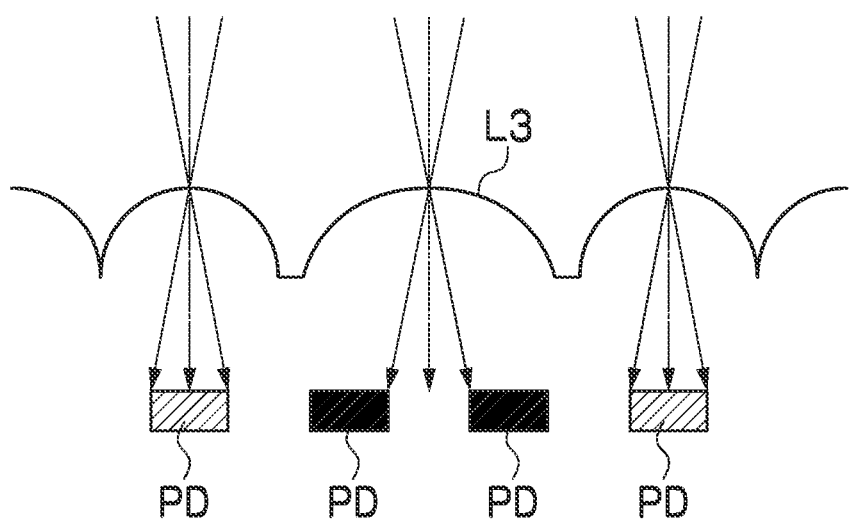
FIG. 6 is a diagram illustrating another example of configuration of the CCD.

The configuration of the pixels A and B for phase difference detection is not limited to the case of displacing the microlenses L2 as illustrated in FIGS. 3 and 4. The positions of the photodiodes PD may be displaced relative to the microlenses. Alternatively, one microlens L3 may be arranged over two photodiodes PD as illustrated in FIG. 6, and the two photodiodes PD may be set as the pixels A and B.

Returning to FIG. 1, signal charge stored in the CCD 16 is read out as a voltage signal corresponding to the signal charge based on a reading signal provided from the CCD control unit 32. The voltage signal read out from the CCD 16 is provided to an analog signal processing unit 18. The analog signal processing unit 18 samples and holds R, G, and B signals of the pixels and amplifies the signals before providing the signals to an A/D converter 20. The A/D converter 20 converts the sequentially inputted R, G, and B signals into digital R, G, and B signals and outputs the signals to an image input controller 22.

An image signal of one screen (surface A) of even number lines is read out from the CCD 16, and an image signal of one screen (surface B) of odd number lines is read out. As described below, image processing is applied as necessary to the image signals of the surfaces A and B.

A digital signal processing unit 24 applies predetermined signal processing, such as offset processing, gain control processing including white balance correction and sensitivity correction, gamma correction processing, and RGB/YC conversion processing, to the image signals inputted through the image input controller 22 and executes a combining process, etc. of the image signals of the surfaces A and B.

The image data processed by the digital signal processing unit 24 is inputted to a VRAM (Video Random Access Memory) 50. The VRAM 50 includes areas M1 and M2 for storing image data, each indicating an image of one frame. In the VRAM 50, the image data indicating an image of one frame is alternately rewritten in the areas M1 and M2. The written image data is read out from an area other than the area in which the image data is being rewritten among the areas M1 and M2 of the VRAM 50. A video encoder 28 encodes the image data read out from the VRAM 50, and the image data is outputted to the liquid crystal monitor (LCD) 30 arranged on the back (rear) side of the camera. As a result, an image of a subject is displayed on the display screen of the liquid crystal monitor 30.

When there is pressing of the first step (half-press) of the shutter button of the operation unit 38, an AF (automatic focus adjustment) operation and an AE (automatic exposure) operation start. More specifically, the image data of the surface B (output signals of pixels for phase difference detection) among the image data outputted from the A/D converter 20 is imported to a phase difference detection unit 42. The phase difference detection unit 42 detects the phase difference between the image data of the pixels A and the image data of the pixels B within a predetermined focus area among the image data of the surface B and outputs information indicating the phase difference to the CPU 40. The CPU 40 calculates the amount of defocus based on the phase difference information inputted from the phase difference detection unit 42 and controls the position of the focus lens included in the imaging lens 12 through the lens driving unit 36 to make the amount of defocus "0".

The predetermined focus area in which the phase difference is detected includes at least one of a preset focus area at the screen center, a face area detected by the face detection unit 46, an area instructed as necessary by the user. In the face detection by the face detection unit 46, an image of a predetermined target area and a face image template are compared while moving the position of the target area in the photographed image to check the correlation between the image and the template, and the target area is detected as a face area if the correlation score thereof exceeds a preset threshold. Other face detection methods that can be used include known methods, such as a face detection method by edge detection or shape pattern detection and a face detection method by hue detection or skin color detection.

The image data outputted from the A/D converter 20 during the half-press of the shutter button is imported to an AE detection unit 44. The AE detection unit 44 integrates G signals of the entire screen, integrates the G signals with different weights for the screen center part and the peripheral part, or integrates the G signals of the face area detected by the face detection unit 46 and outputs the integrated value to the CPU 40. The CPU 40 calculates brightness (imaging Ev value) of the subject from the integrated value inputted from the AE detection unit 44, determines an aperture value of the aperture 14 and an electric shutter (shutter speed) of the CCD 16 based on the imaging Ev value in accordance with a predetermined program diagram, controls the aperture 14 through the aperture driving unit 34 based on the determined aperture value, and controls the charge storage time in the CCD 16 through the CCD control unit 32 based on the determined shutter speed.

When the AE operation and the AF operation are finished and there is pressing of the second step (full-press) of the shutter button, the image input controller 22 inputs the image data of the surfaces A and B outputted from the A/D converter 20 to a memory (SDRAM: Synchronous Dynamic Random Access Memory) 48 in response to the pressing, and the image data is temporarily stored.

The image data of the surfaces A and B is read out from the memory 48, and the digital signal processing unit 24 executes predetermined signal processing including an image combining process and a generation process of luminance data and color difference data of the combined image data (RGB/YC conversion processing). The RGB/YC conversion-processed image data (YC data) is read out from the digital signal processing unit 24 and stored again in the memory 48. Subsequently, the YC data is outputted to the compression/decompression processing unit 26, and a predetermined compression process such as JPEG (joint photographic experts group) is executed. The compressed YC data is outputted and stored again in the memory 48, read out by a media controller 52, and recorded in the memory card 54.

[Imaging Operation]

Next, an operation during imaging by the digital camera 10 configured as described above will be described.

Figure 7:
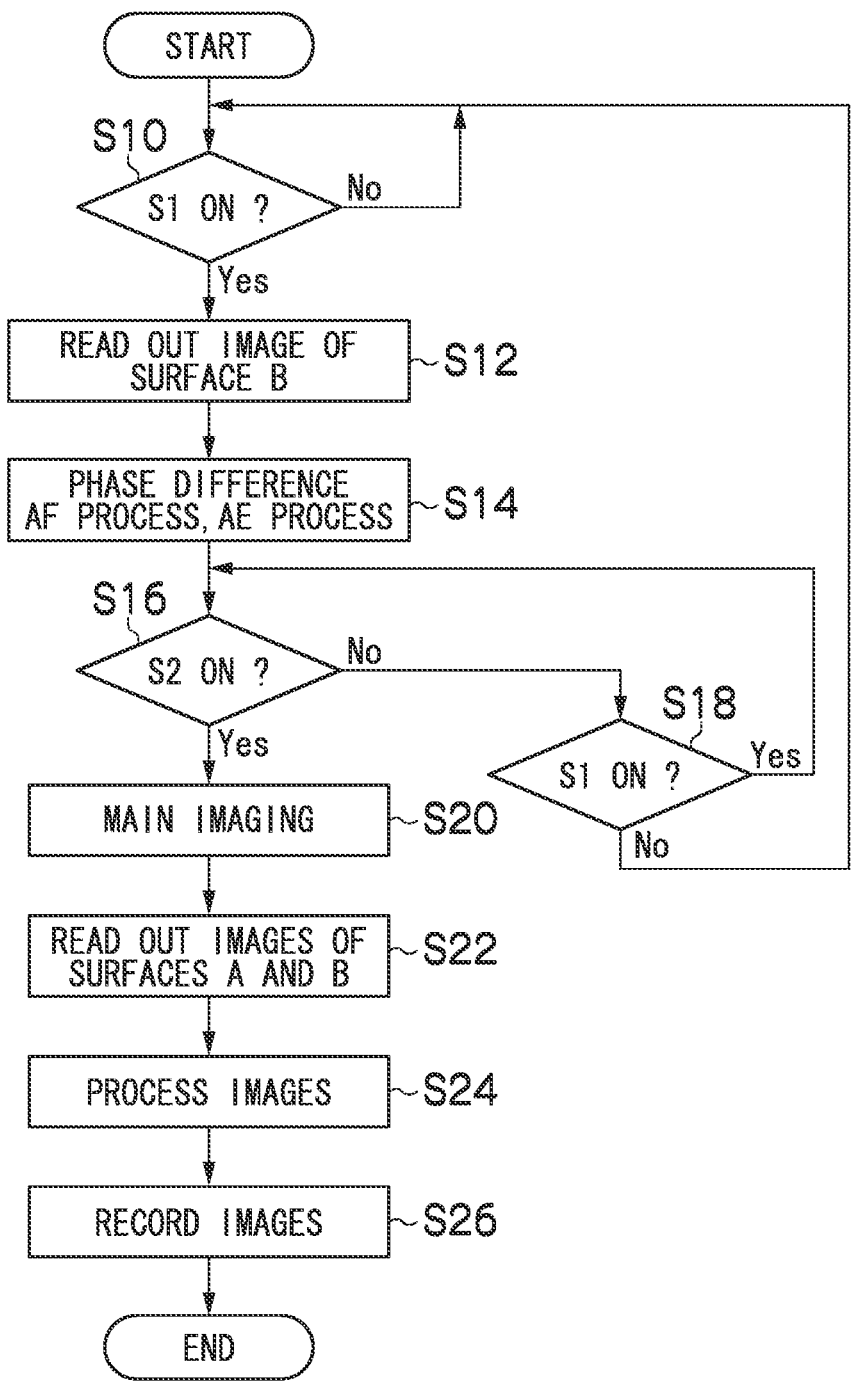
FIG. 7 is a flowchart illustrating a processing procedure during imaging of the image pickup apparatus (digital camera) according to the presently disclosed subject matter.

FIG. 7 is a flowchart illustrating a processing procedure during imaging by the image pickup apparatus (digital camera 10) according to the presently disclosed subject matter.

In FIG. 7, whether the shutter button of the operation unit 38 is half-pressed (S1 is ON) is determined (step S10). When S1 of the shutter button is ON, the CPU 40 orders reading out of the image data of the surface B including the signals of the pixels for phase difference detection (step S12) and executes phase difference AF process and AE process based on the read out image data (step S14). More specifically, as described, the CPU 40 causes the phase difference detection unit 42 to detect the phase difference between the image data of the pixels A and the image data of the pixels B within the predetermined focus area among the image data of the surface B, calculates the amount of defocus based on the phase difference information, and controls the imaging lens 12 through the lens driving unit 36 to make the amount of defocus "0". The CPU 40 further causes the AE detection unit 44 to integrate the G signals and determines imaging conditions, such as the shutter speed and the aperture value, based on the integrated value.

Subsequently, whether the shutter button is full-pressed (S2 is ON) is determined (step S16). If S2 is not ON, whether S1 is ON is determined again (step S18). If S1 is ON, the process moves to step S16, and if S1 is not ON, the process moves to step S10.

If it is determined in step S16 that S2 of the shutter button is ON, the CPU 40 orders the main imaging under the imaging conditions, such as the shutter speed and the aperture value, set in the AE process of step S14 (step S20). The CPU 40 acquires the image data of the surfaces A and B of the CCD 16 acquired by the main imaging (step S22) and executes image processing of the image data of the surfaces A and B (step S24).

As can be seen clearly from FIGS. 3 and 4, the light amounts entering the photodiodes PD are different between the normal pixels of the surface A and the pixels for phase difference detection of the surface B. As a result, the pixels of the surface A are high-sensitivity pixels, and the pixels of the surface B are low-sensitivity pixels. Incidentally, the incident light amount of the pixels of the surface B is about 30% of the incident light amount of the pixels of the surface A.

Figure 8:
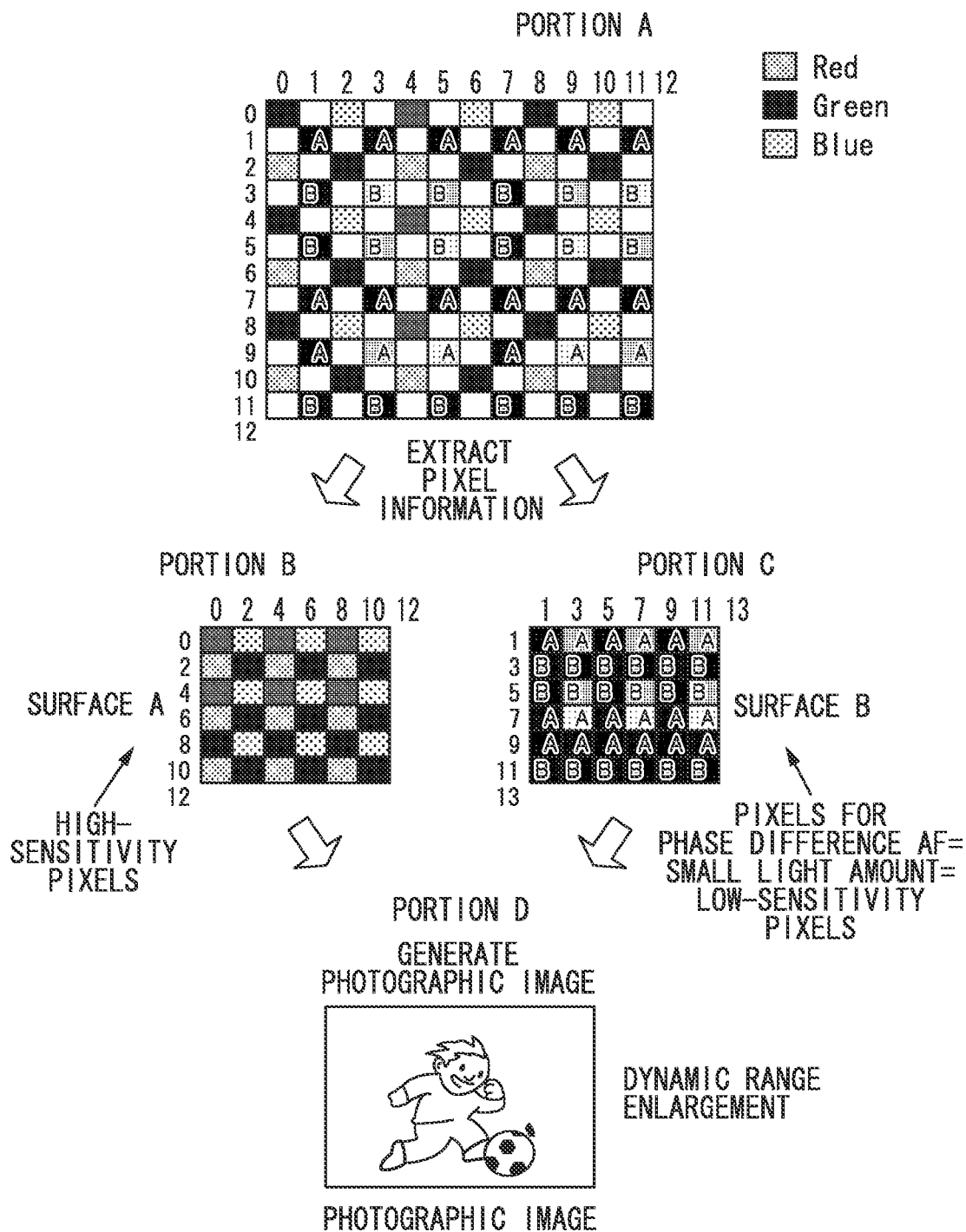
FIG. 8 is an image diagram illustrating image processing of enlarged dynamic range.

In step S24 of FIG. 7, image processing for generating a wide dynamic range image is performed based on the image data of the high-sensitivity pixels of the surface A and the image data of the low-sensitivity pixels of the surface B acquired by the main imaging as illustrated in FIG. 8.

In FIG. 8, pieces of pixel information (image data) of the surfaces A and B are extracted (PORTION A). Then, the image data of the surface A (PORTION B: relatively high-sensitivity pixels) and the image data of the surface B (PORTION C: relatively low-sensitivity pixels or pixels for phase difference AF which have received smaller light amount) are acquired. Next, the image data of the surface A and the image data of the surface B are combined, and a photographic image is generated (PORTION D). In portion D of FIG. 8, dynamic range of the generated photographic image is enlarged.

As the image processing for generating a wide dynamic range image based on the image data of the relatively high-sensitivity pixels and the image data of the relatively low-sensitivity pixels, the techniques described in Japanese Patent Application Laid-Open Nos. 2004-221928 and 2006-135684 can be utilized. For example, according to the image processing described in Japanese Patent Application Laid-Open 2006-135684, tones of the high-sensitivity image data and the low-sensitivity image data are converted and added, and gamma correction, etc. is further applied to the added image data. In the tone conversion before addition, the tones are converted to smoothly change the addition result from luminance "0" to the maximum luminance.

As described, the incident light amount of the pixels of the surface B is about 30% of the incident light amount of the pixels of the surface A, and the sensitivity of the pixels of the surface B is about one third of the pixels of the surface A. Therefore, assuming that the dynamic range of the image obtained from the pixels of the surface A is 100%, the dynamic range of the wide dynamic range image after combining is 300%.

A compression process, etc. is applied to the image data with enlarged dynamic range, and the data is recorded in the memory card 54 (step S26).

<Second Example of Configuration of CCD>

Figure 9:
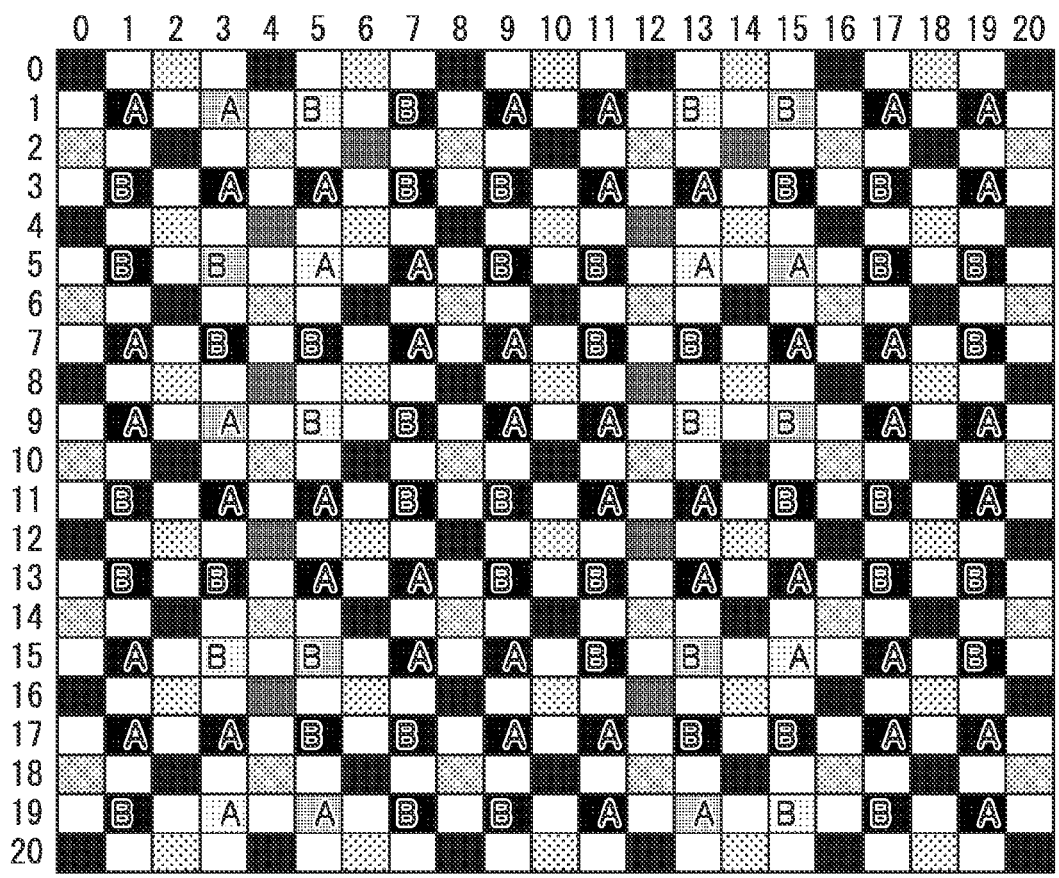
FIG. 9 is a diagram illustrating a second example of configuration of the CCD according to the presently disclosed subject matter.

FIG. 9 is a diagram illustrating a second example of configuration of the CCD according to the presently disclosed subject matter.

In the CCD illustrated in FIG. 9, the arrangement of the pixels A and B for phase difference detection arranged on the surface B is different as compared to the CCD illustrated in FIG. 2, and other points are common.

More specifically, in the pixels A and B for phase difference detection of the CCD illustrated in FIG. 2, the pixels A and B are alternately arranged every two odd number lines. In the CCD illustrated in FIG. 9, two pixels A and two pixels B are alternately arranged every odd number line. Therefore, the phase difference can be detected from an output signal of pixels in one odd number line.

<Second Embodiment of Imaging Operation and Image Processing>

In a second embodiment, the exposure control during main imaging in step S20 of FIG. 7 is different, and the image processing in step S24 is different.

Figure 10:
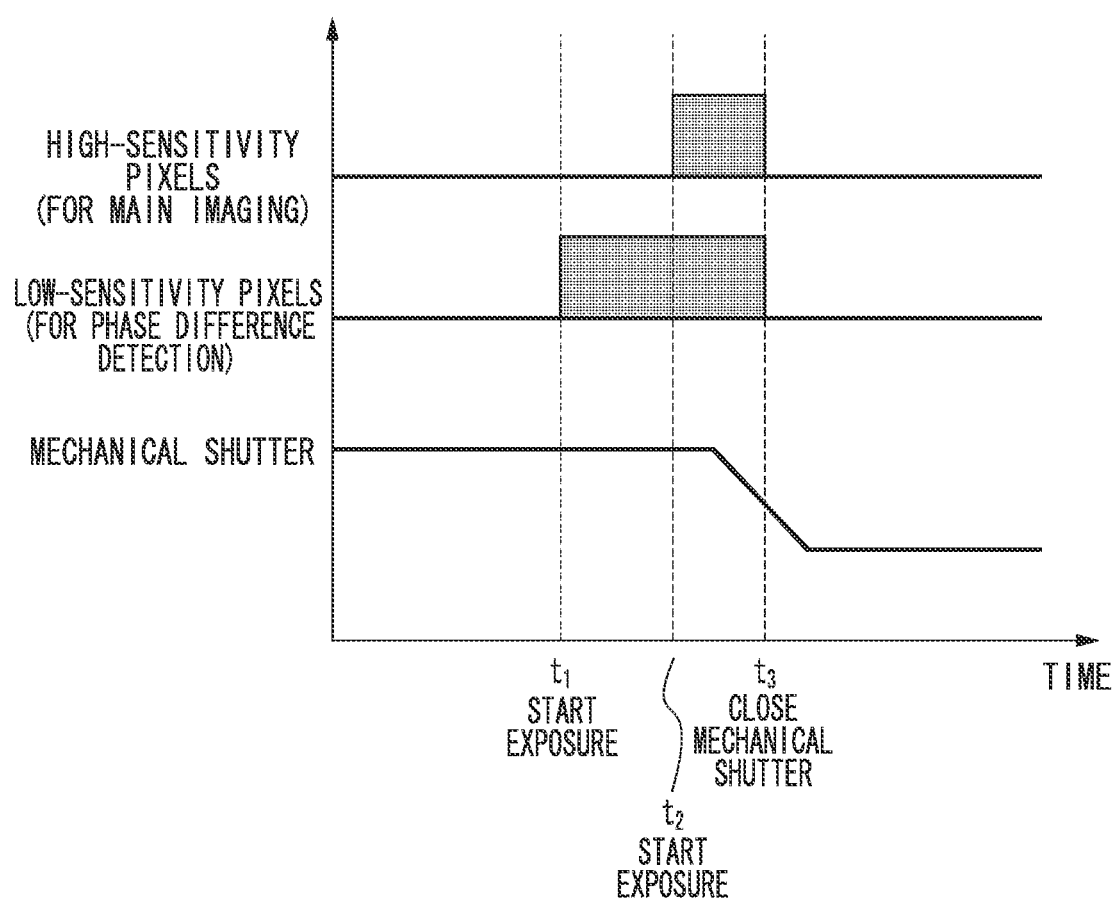
FIG. 10 is a diagram illustrating an example of exposure control according to the presently disclosed subject matter.

In the main imaging of step S20, as illustrated in FIG. 10, exposure times (shutter speeds) in the normal pixels (high-sensitivity pixels) and the pixels for phase difference detection (low-sensitivity pixels) are designed to be different to obtain images with the same sensitivity.

More specifically, the mechanical shutter opens, and sweeping out of the charge stops in the low-sensitivity pixels at time t1 to start storing the charge (start exposure). Sweeping out of the charge stops in the high-sensitivity pixels at time t2 (>t1) to start storing the charge (start exposure), and the mechanical shutter closes at time t3.

The ratio of the charge storage time of the high-sensitivity pixels to the charge storage time of the low-sensitivity pixels is set to be the reciprocal of the ratio of the sensitivity of the high-sensitivity pixels to the sensitivity of the low-sensitivity pixels.

Figure 11:
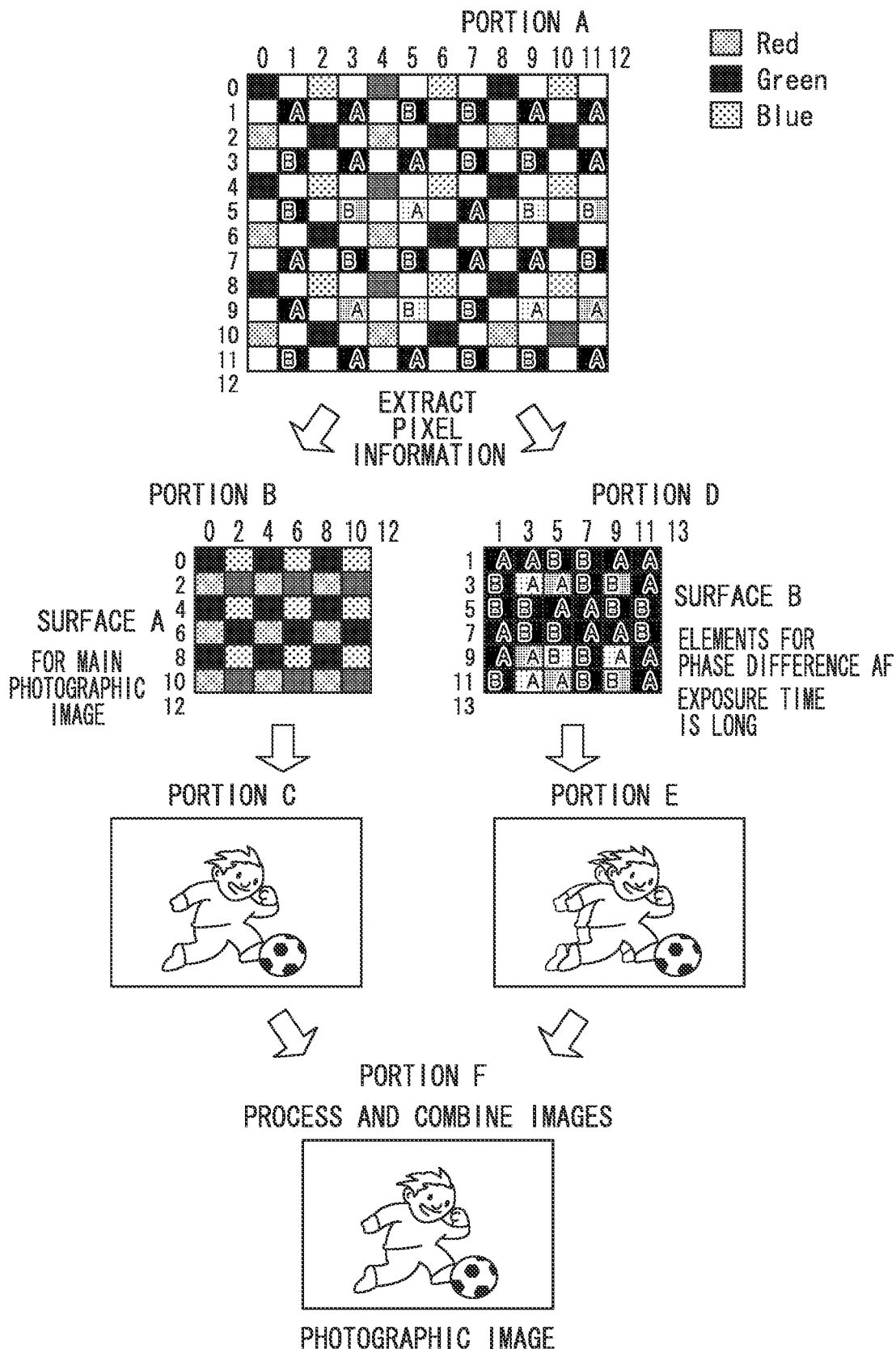
FIG. 11 is a diagram illustrating a flow of high-resolution image processing.

In FIG. 11, the sensitivity of the image of the surface A (PORTION B: pixels for a main photographic image) and the sensitivity of the image of the surface B (PORTION D: pixels for phase difference AF whose exposure time is longer than the pixels for the surface A) acquired by the main imaging are the same. In the image processing of step S24, one high-resolution photographic image (PORTION F) is generated from the two images by processing and combining the images of the surfaces A and B, in which the pixels of the images are alternately arranged.

Since the shutter speed of the image of the surface B is slower than that of the image of the surface A, the image may be affected by the camera shake (PORTIONS C and E). In the case of the shutter speed with which the image is affected by the camera shake, instead of changing the shutter speed, the gain (sensitivity) of the image of the surface B is changed to make the luminance levels of the images of the surfaces A and B identical.

<Third Example of Configuration of CCD>

Figure 12:
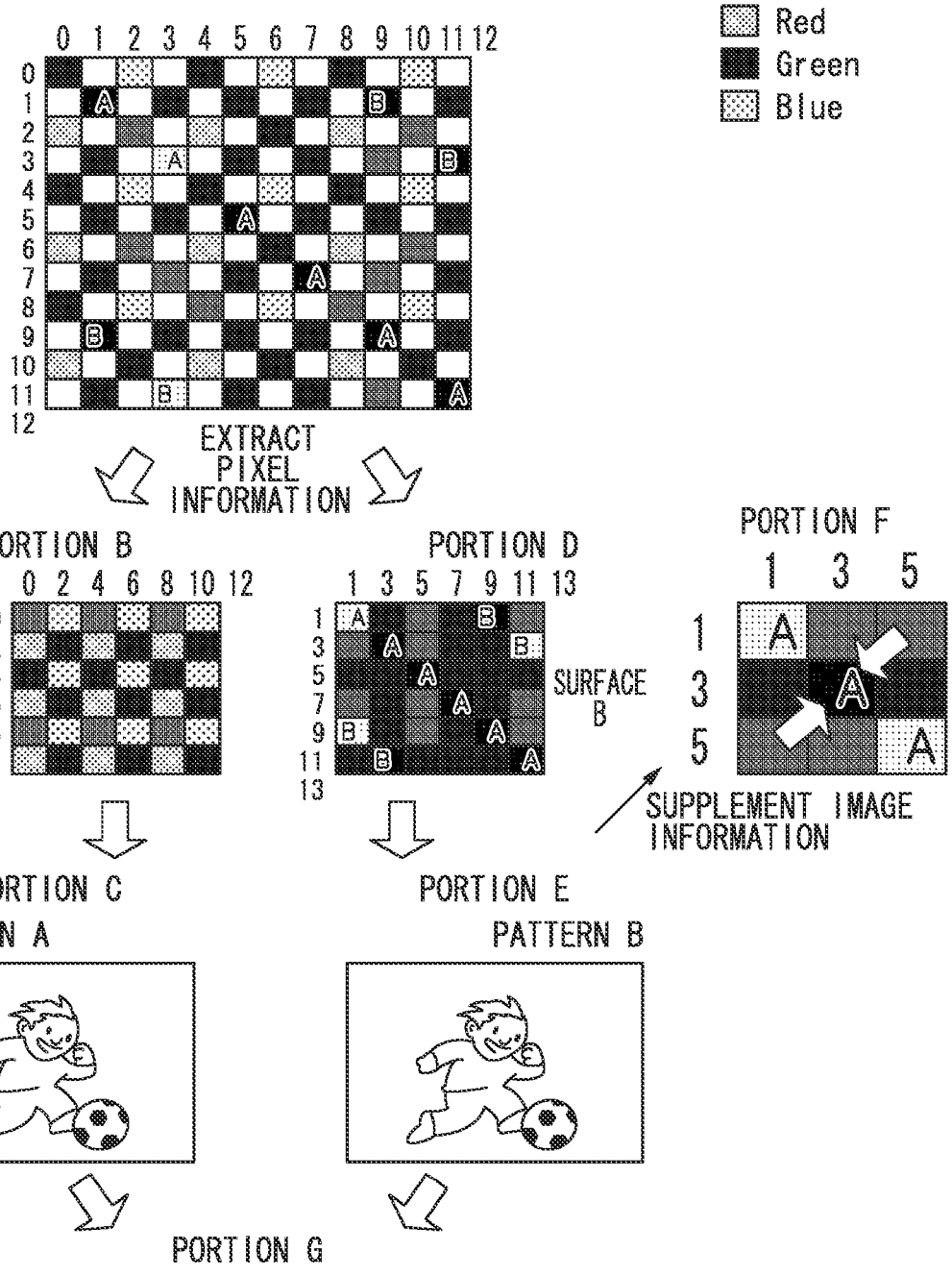
FIG. 12 is a diagram illustrating a third example of configuration of the CCD according to the presently disclosed subject matter and a flow of high-resolution image processing of an image obtained from the CCD.

PORTION A of FIG. 12 is a diagram illustrating a third example of configuration of the CCD according to the presently disclosed subject matter.

In the CCD illustrated in PORTION A of FIG. 12, the arrangement of the pixels A and B for phase difference detection arranged on the surface B is different as compared to the CCD illustrated in FIG. 2, and other points are common.

More specifically, in the CCD illustrated in FIG. 12A, the pixels A and B are alternately arranged every three G pixel in the odd number lines (PORTION D). Although the pixels A and B for phase difference detection are thinned out, the phase difference can be detected if a plurality of pixels A and B are included in a desired focus area (PORTIONS D to F).

<Third Embodiment of Image Processing>

In the CCD illustrated in PORTION A of FIG. 12, the low-sensitivity pixels for phase difference detection and normal high-sensitivity pixels (pixels for non-phase detection) are mixed in the pixels of the surface B. Therefore, the pixels for phase difference detection are corrected by the surrounding pixels for non-phase difference detection to raise the sensitivity of the pixels for phase difference detection.

An example of the correction method (PORTION F) includes a method of interpolating the pixel values of a plurality of pixels for non-phase difference detection that are close to the pixels for phase difference detection and that are in the same color, and setting the interpolated values as the pixel values of the pixels for phase difference detection. Image processing of raising the gain (sensitivity) of only the image data of the pixels for phase difference detection may be executed.

In this way, the sensitivity of the image of the surface A acquired by the main imaging and the sensitivity of the image of the surface B with corrected pixels for phase difference detection are the same. One high-resolution image is generated by alternately arranging the pixels of the images from the two images (PORTION G).

<Fourth Embodiment of Image Processing>

In a fourth embodiment, image processing in step S24 of FIG. 7 is different.

Figure 14A:
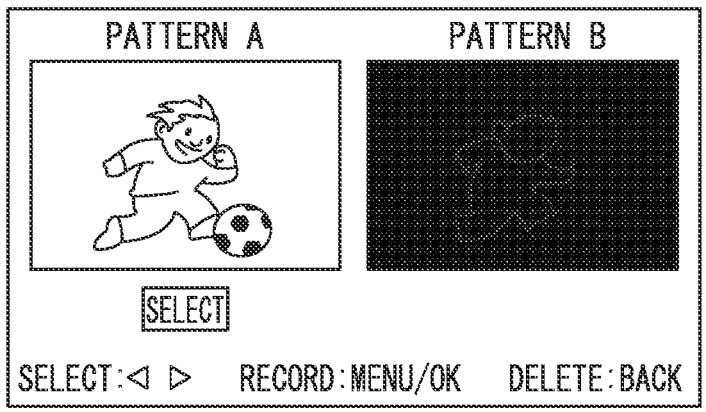
FIGS. 14A to 14C are diagrams illustrating an example of a screen of a liquid crystal monitor displaying the image of the surface A and the image of the surface B.
Figure 14B:
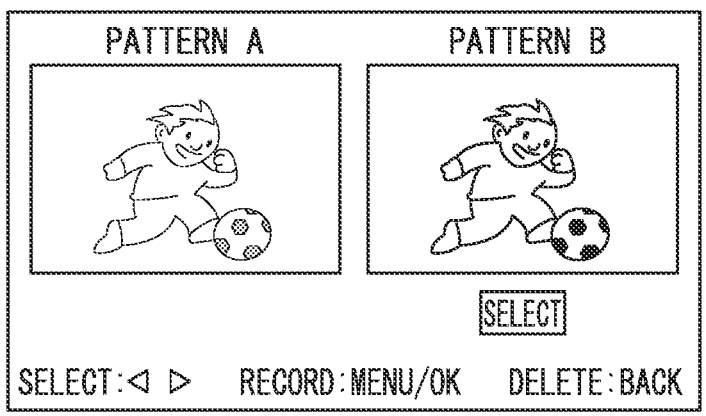
Figure 14C:
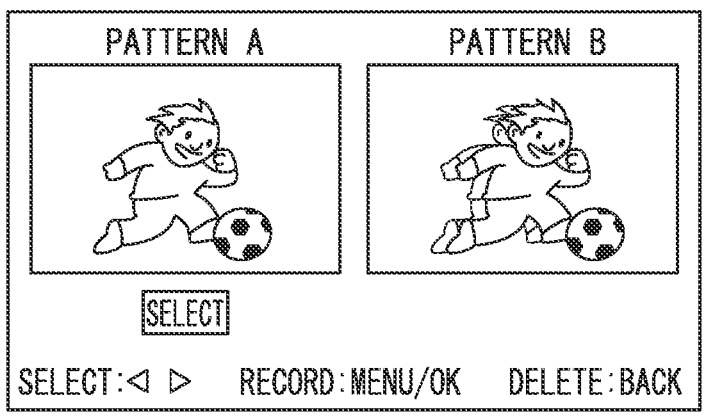
Figure 15A:
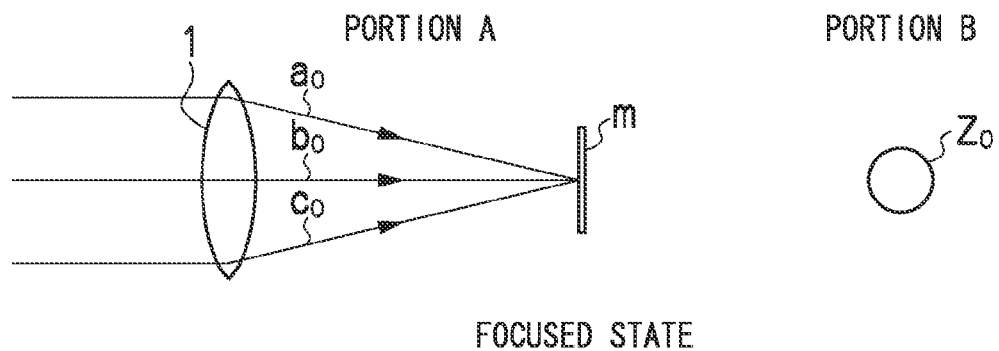
FIGS. 15A to 15C are diagrams illustrating states during focusing, front focusing, and back focusing.
Figure 15B:
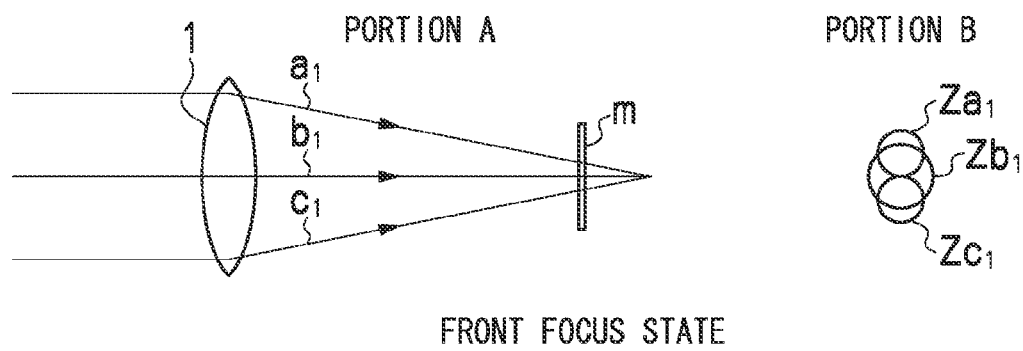
Figure 15C:
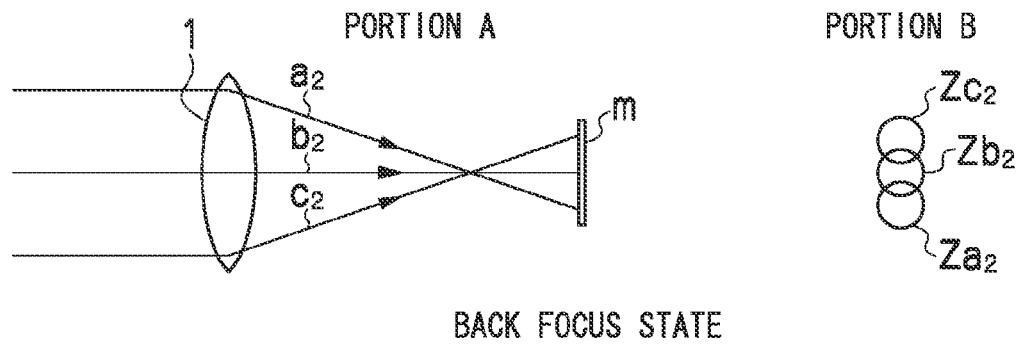
Figure 16:
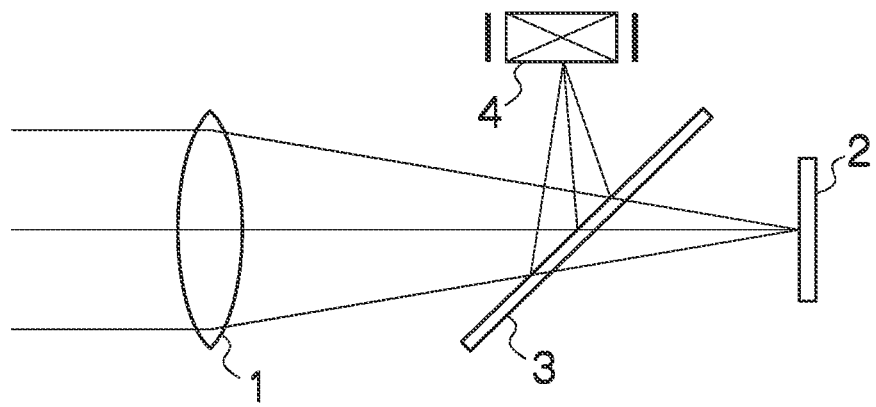
FIG. 16 is a diagram illustrating an example of arrangement of a conventional sensor for phase difference detection.
Figure 17:
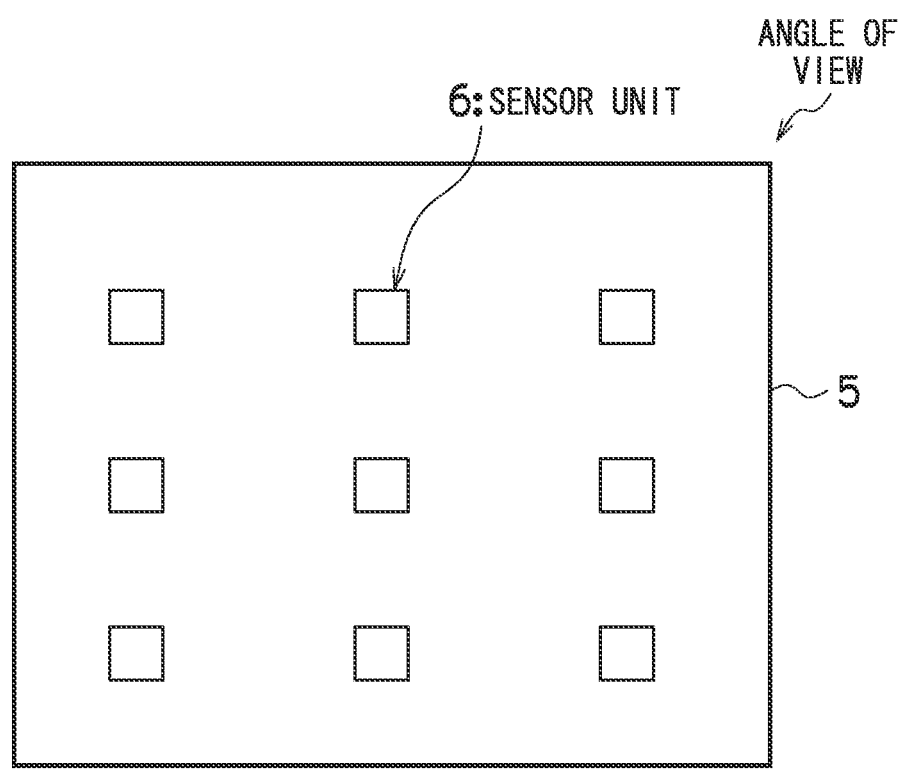
FIG. 17 is a diagram illustrating an example of arrangement of pixels for phase difference detection in a CCD.

The high-sensitivity image of the surface A (PORTIONS B and C) and the low-sensitivity image of the surface B (PORTIONS D and E) are acquired as illustrated in FIG. 13. The CPU 40 displays the images of the surfaces A and B on the liquid crystal monitor 30 as illustrated in FIGS. 14A to 14C. The user selects one of the images of the surfaces A and B displayed on the liquid crystal monitor 30 and instructs recording of the selected image (PORTION F of FIG. 13).

Although the image of the surface A is usually an image with appropriate exposure, highlight clipping may occur at a high-luminance part because the sensitivity of the image is higher than that of the image of the surface B. On the other hand, since the image of the surface B is a low-sensitivity image, shadow clipping may occur to a low-luminance part. The user can operate the left and right keys of the arrow keys to select one of the images of the surfaces A and B and can operate the MENU/OK key to record the selected image in the memory card 54.

FIG. 14A illustrates a state in which the image of the surface A with appropriate exposure and without highlight clipping is selected. FIG. 14B illustrates a state in which the image of the surface B is selected because there is highlight clipping in the image of the surface A.

If the shutter speed of the surface B is slowed down as in the embodiment illustrated in FIG. 10, there may be a camera shake in the image of the surface B. Therefore, the images of the surfaces A and B may be displayed as illustrated in FIG. 14C, and an image may be selected in consideration of the presence of the camera shake.

Two images after exposure correction can be obtained even when an image is taken by performing exposure correction, etc. in the manual imaging mode. Therefore, images with more optimally controlled exposure can be selected.

It is obvious that the presently disclosed subject matter is not limited to the embodiments, and various modifications can be made without departing from the scope of the presently disclosed subject matter.

What is claimed is:

1. An image pickup apparatus comprising:
   an imaging lens;
   an image pickup element including pixels of a first group and pixels of a second group for photoelectric conversion arranged in matrix, the pixels of the second group including pixels for phase difference detection, wherein an incident direction of a light flux which passes through an emission pupil of the imaging lens and enters the pixels of the first group is not restricted, and an incident direction of a light flux which passes through the emission pupil of the imaging lens and enters the pixels of the second group is restricted, the image pickup element configured to be capable of independently reading out first image signals and second image signals from the pixels of the first group and the pixels of the second group, respectively;
   a defocus amount calculation device configured to read out the second image signals from the image pickup elements and to calculate an amount of defocus of the imaging lens based on image signals read out from the pixels for phase difference detection among the second image signals;
   a focus control device configured to perform a focus adjustment by moving the imaging lens so as to make the amount of defocus calculated by the defocus amount calculation device 0;
   an image processing device configured to read out the first image signals and the second image signals from the image pickup element after the focus adjustment performed by the focus control device;
   and a recording device configured to record the image generated by the image processing device in a recording medium.

2. The image pickup apparatus according to claim 1, wherein the pixels for phase detection of the image pickup element includes one microlens for two adjacent pixels, and the microlens causes the light flux passing through the emission pupil of the imaging lens to split and enter to the two adjacent pixels.

3. The image pickup apparatus according to claim 1, wherein all of the pixels of the second group of the image pickup element are the pixels for phase difference detection.

* * * * *